US009645597B1

(12) United States Patent
Xiong et al.

(10) Patent No.: US 9,645,597 B1
(45) Date of Patent: May 9, 2017

(54) CIRCUIT AND METHOD FOR INDIRECTLY SENSING CURRENT AND VOLTAGE IN A FLOATING OUTPUT POWER SUPPLY

(71) Applicant: Universal Lighting Technologies, Inc., Madison, AL (US)

(72) Inventors: Wei Xiong, Madison, AL (US); Candice Ungacta, Huntsville, AL (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 767 days.

(21) Appl. No.: 14/096,406

(22) Filed: Dec. 4, 2013

Related U.S. Application Data

(60) Provisional application No. 61/733,464, filed on Dec. 5, 2012.

(51) Int. Cl.
*G05D 3/12* (2006.01)
*G05F 1/70* (2006.01)

(52) U.S. Cl.
CPC .................................... *G05F 1/70* (2013.01)

(58) Field of Classification Search
CPC ........................................................ G05F 1/70
See application file for complete search history.

(56) References Cited

U.S. PATENT DOCUMENTS 5,881,148 A * 3/1999 Koenig ................. H04M 3/005
323/270

* cited by examiner

*Primary Examiner* — Carlos Ortiz Rodriguez
(74) *Attorney, Agent, or Firm* — Patterson Intellectual Property Law, PC; Mark J. Patterson; Gary L. Montle

(57) ABSTRACT

A floating output power supply includes circuitry for indirectly sensing an output current and output voltage of the floating output power supply. The circuitry includes a circuit ground referenced current sensing resistor placed in between diodes forming one leg of a full wave rectifier. The voltage of this current sensing resistor is circuit ground referenced and representative of an output current of the floating output power supply. A resistive network is coupled between a negative output and a positive output of the floating output power supply. The resistive network includes a circuit ground referenced resistor whose voltage is representative of the output voltage of the floating output power supply. A controller of the floating output power supply determines output voltage, current, and/or power from these sensed voltages and currents and adjusts an operating parameter of an input power supply as a function of the determined output voltage, current, and/or power.

19 Claims, 2 Drawing Sheets

CIRCUIT AND METHOD FOR INDIRECTLY SENSING CURRENT AND VOLTAGE IN A FLOATING OUTPUT POWER SUPPLY

CROSS-REFERENCES TO RELATED APPLICATIONS

This application claims priority to and incorporates herein by reference in its entirety U.S. Provisional Patent Application Ser. No. 61/733,464 filed on Dec. 5, 2012 entitled "CIRCUIT AND METHOD FOR INDIRECTLY SENSING CURRENT AND VOLTAGE IN A FLOATING OUTPUT POWER SUPPLY."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to methods and circuits for sensing output current and voltage in a floating output power supply.

Sensing output current and voltage sensing in a power supply with an output referenced to a ground of the input power source is relatively simple. A current sensing resistor configured in series with the output (e.g., coupled between the ground and the positive output of the power supply) is used to sense current, and the voltage of the output can be directly sensed or reduced via a resistive network. However, the output of a floating output power supply is not referenced to the ground of the input power source. Direct output voltage and current sensing is therefore more complicated.

Referring to prior art FIG. 1, a floating output power supply has a positive output 102 and a negative output 104. However, the negative output 104 is not tied to a ground of the input power source 106 and/or controller 108. In one embodiment, the input power source 106 is a voltage controlled variable frequency alternating current (AC) voltage source. The controller 108 is referenced to a ground of the input power source 106 and varies the frequency of the input power source as a function of a sensed voltage (i.e., V_sense) and/or sensed current (i.e., I_sense).

Operational amplifiers provide differential input sensing characteristics that are conventionally used to sense the output voltage and output current, and to provide signals indicative of the sensed output voltage (i.e., V_sense) and current (i.e., I_sense) to the controller 108. Operational amplifier based differential sensing solutions are typically expensive and complicated due to wide fluctuations in the voltage of the negative output relative to the ground of the input power source 106 and controller 108.

BRIEF SUMMARY OF THE INVENTION

Aspects of the present invention provide simple and reliable circuits for directly sensing and determining output currents and voltages in floating output power supplies such as used with light fixtures (e.g., light emitting diode packages).

In one aspect, a light fixture includes a light source, a floating output power supply, and a housing. The light source provides illumination in response to receiving power. The housing supports the light source and the floating output power supply. The floating output power supply provides power to the light source. The floating output power supply has a circuit ground, a negative output, and a positive output. The floating output power supply includes an alternating current (AC) power supply, a controller, a rectifier, a current sensor, and a resistive network. The AC power supply is referenced to the circuit ground of the floating output power supply. The controller has a voltage sensing input to sense an output voltage of the floating output power supply and a current sensing input to sense an output current of the floating output power supply. The controller adjusts an operating characteristic of the AC power supply as a function of the sensed output current and the sensed output voltage.

The rectifier includes a first diode and a second diode coupled in series between the negative output and the positive output of the floating output power supply. The first diode has an anode coupled to the negative output of the floating output power supply and a cathode coupled to the circuit ground. The second diode has a cathode coupled to the positive output of the floating output power supply. The current sensing resistor is coupled between an anode of the second diode and the circuit ground. The current sensing input of the controller is coupled to the anode of the second diode. The resistive network is coupled in series between the negative output and the positive output of the floating output power supply. The resistive network includes a first resistor, a second resistor, and a third resistor. The first resistor is coupled between the negative output of the floating output power supply and the circuit ground of the floating output power supply. The second resistor has a first terminal coupled to the circuit ground of the floating output power supply and a second terminal coupled to the voltage sensing input of the controller. The third resistor has a first terminal coupled to the positive output of the floating output power supply and a second terminal coupled to the second terminal of the second resistor.

In another aspect, a floating output power supply has a circuit ground, a negative output, and a positive output. The floating output power supply includes an AC power supply, a controller, a rectifier, and a current sensing resistor. The AC power supply is referenced to the circuit ground of the floating output power supply. The controller has a current sensing input to sense an output current of the floating output power supply. The controller adjusts an operating characteristic of the AC power supply as a function of the sensed output current. The rectifier includes a first diode and a second diode coupled in series between the negative output and the positive output of the floating output power supply. The first diode has an anode coupled to the negative output of the floating output power supply and a cathode coupled to the circuit ground. The second diode has a cathode coupled to the positive output of the floating output power supply. The current sensing resistor is coupled between an anode of the second diode and the circuit ground. The current sensing input of the controller is coupled to the anode of the second diode.

In another aspect, a floating output power supply has a circuit ground, a negative output, and a positive output. The floating output power supply includes an AC power supply, a controller, and a resistive network. The AC power supply is referenced to the circuit ground of the floating output power supply. The controller has a voltage sensing input to sense an output voltage of the floating output power supply. The controller adjusts an operating characteristic of the AC power supply as a function of the sensed output voltage. The resistive network is coupled in series between the negative output in the positive output of the floating output power supply. The resistive network includes a first resistor, a second resistor, and a third resistor. The first resistor is coupled between the negative output of the floating output power supply and the circuit ground of the floating output power supply. The second resistor has a first terminal coupled to the circuit ground of the floating output power supply and a second terminal coupled to the voltage sensing input of the controller. The third resistor has a first terminal coupled to the positive output of the floating output power supply and a second terminal coupled to the second terminal of the second resistor.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids. Further, "connected between" or "connected to" or "coupled" means directly or indirectly electrically connected when referring to electrical devices in circuit schematics or diagrams.

Figure 1:
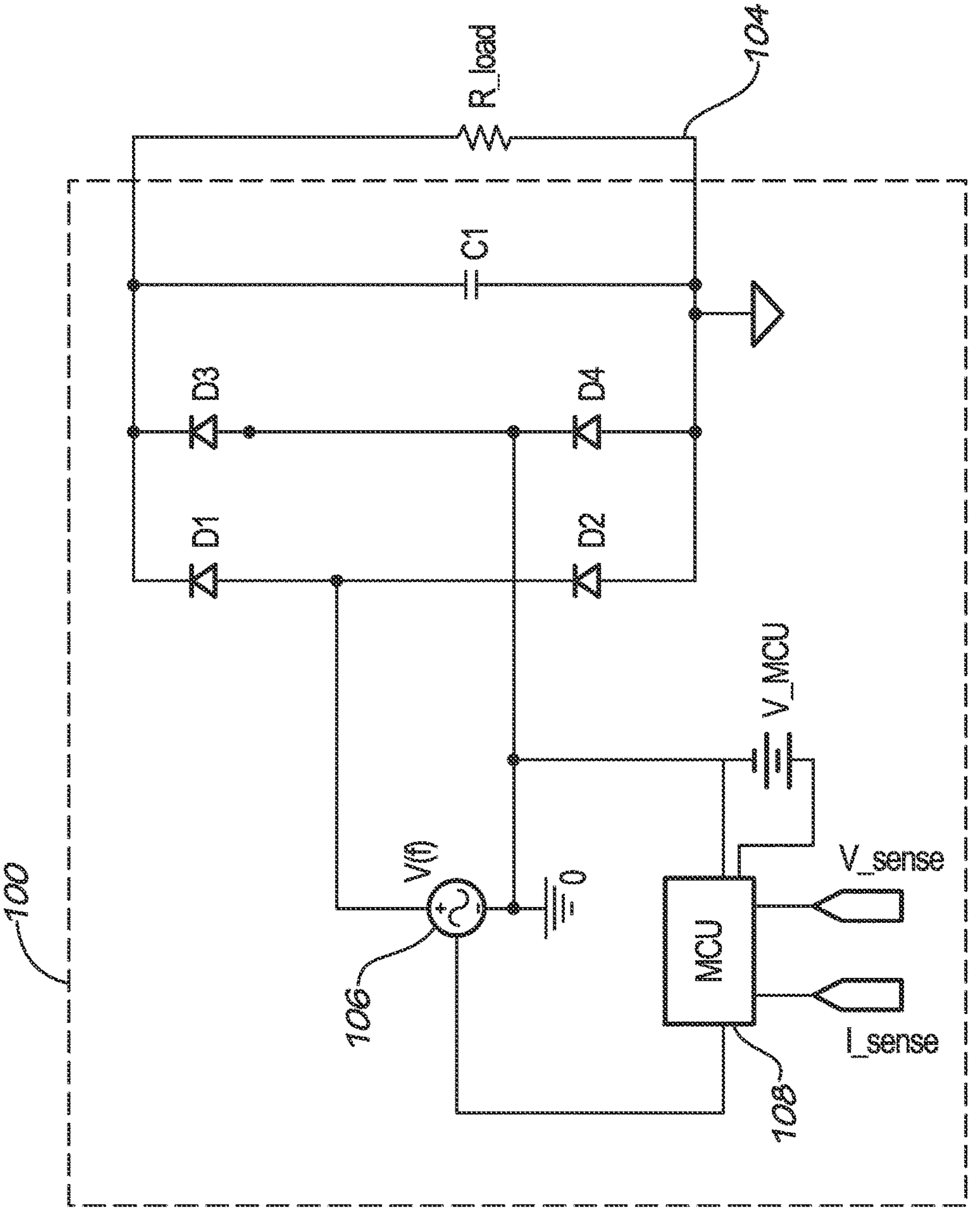
PRIOR ART FIG. 1
FIG. 1 is a partial schematic diagram of a prior art floating output power supply.
Figure 2:
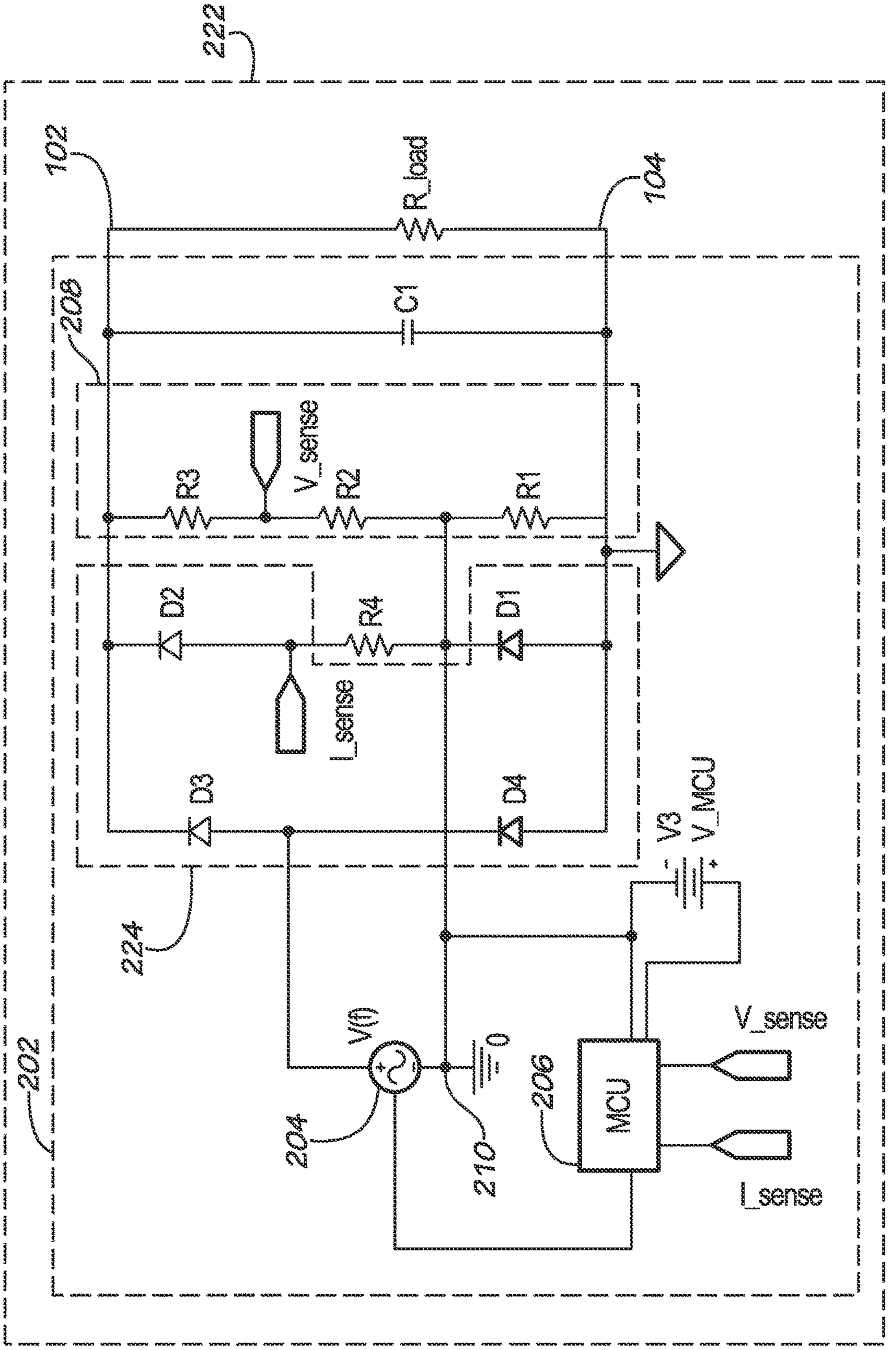
FIG. 2 is a partial schematic diagram of a light fixture including a floating output power supply in accordance with an embodiment of the present invention.

Referring to FIG. 2, a light fixture 220 including circuitry for indirectly sensing output voltage and current of a floating output power supply 202 is shown. A current sensing resistor R4 is used to provide a voltage indicative of a current through a rectifier diode D3. A DC output current of the floating output power supply 202 (i.e., the current through the load R_load) is approximately twice the average current through the current sensing resistor R4 (see Equation 1).

$$I_{R\_load}=2\times I_{R4} \qquad \text{EQUATION 1}$$

The voltage across the current sensing resistor R4 is referenced to the same ground (i.e., a circuit ground 210) as that of an AC power supply 204 and controller 206 of the floating output power supply 202 such that the controller 206 can directly use this signal (i.e., voltage) to sense or determine the output current.

A resistive network 208 including a first resistor R1, a second resistor R2, and a third resistor R3 is configured such that the voltage across the second resistor R2 is proportional to the output voltage of the floating output power supply 202.

$$R_2+R_3=R_1 \qquad \text{EQUATION 2}$$

Equation 2 ensures that the voltage across the two halves of the rectifier branch including the current sensing resistor R4 will be the same. That is, the voltage across the current sensing resistor R4 and a second diode D2 equals the voltage across a first diode D1.

$$\frac{V_{R\_load\_max}}{2}\times\frac{R_2}{R_2+R_3}<V_{MCU} \qquad \text{EQUATION 3}$$

Equation 3 ensures that the voltage across the second resistor R2 is less than a supply voltage $V_{MCU}$ when the output voltage of the floating output power supply 202 is at a maximum so that the controller 206 will not be disabled or latched off by the high sensing voltage (i.e., V_sense).

Equations 5 and 6 below demonstrate that the relationships between the voltage across the second resistor R2 (i.e., V_sense) and the voltage across the current sensing resistor R4 (i.e., I_sense) and the actual output voltage (i.e., $V_{R\_load}$) and actual output current (i.e., $I_{R\_load}$) of the floating output power supply 202.

$$V_{sense}=\frac{V_{R\_load}}{2}\times\frac{R_2}{R_2+R_3} \qquad \text{EQUATION 5}$$

$$I_{sense}=\frac{I_{R\_load}}{2} \qquad \text{EQUATION 6}$$

In one embodiment, the controller 206 doubles the sensed current (i.e., I_sense) to determine the actual output current (i.e., $I_{R\_load}$). In one embodiment, the controller 206 can determine the actual output voltage (i.e., $V_{R\_load}$) by determining the product of twice the sensed voltage (V_sense) and the sum of the resistance of the second resistor R2 and the resistance of the third resistor R3, divided by the resistance of the second resistor R2. In one embodiment, the controller 206 controls an operating parameter of the AC power supply 204 as a function of the determined actual output current and/or actual output voltage. In one embodiment, the controller 206 uses the determined actual output current and actual output voltage to determine an output power of the floating output power supply 202 (e.g., multiplies the actual output current by the actual output voltage) and adjusts the operating parameter of the AC power supply 204 as a function of the determined output power.

In one embodiment, the light fixture 220 includes a light source R_load, the floating output power supply 202, and a housing 222. The housing 222 supports the light source R_load in the floating output power supply 202. The light source R_load provides illumination in response to receiving power from the floating output power supply 202. The floating output power supply 202 provides power to the light source R_load. The floating output power supply 202 has a circuit ground 210, a negative output 104, and a positive output 102. The floating output power supply 202 includes the AC power supply 204, the controller 206, a rectifier 224, the current sensing resistor R4, and the resistive network 208.

The AC power supply 204 is referenced to the circuit ground 210 of the floating output power supply 202. In one embodiment, the AC power supply 204 is a variable frequency power supply, and the controller 206 is configured (e.g., programmed) to adjust an operating parameter (e.g. the frequency) of the power supply. In another embodiment, the AC power supply 204 is a variable voltage fixed frequency power supply, and the controller 206 is configured to adjust an operating parameter (e.g., the voltage) of the AC power supply 204.

The controller 206 has a voltage sensing input (V_sense) configured to sense an output voltage of the floating output power supply 202. The controller also has a current sensing input (I_sense) configured to sense an output current of floating output power supply 202. The controller 206 is configured (e.g., programmed) to adjust an operating characteristic of the AC power supply 204 as a function of the sensed output current and/or the sensed output voltage. In one embodiment, the controller 206 senses the output current (i.e., a signal indicative of the output current) by determining a voltage across the current sensing resistor R4 and dividing the determined voltage by the resistance of the current sensing resistor R4. In one embodiment, the controller 206 is further configured to determine a total output current as a function of the sensed output current by doubling the sensed output current. The controller 206 may further adjust the operating characteristic as a function of the determined total output current.

The rectifier 224 includes a first diode D1 and a second diode D2 connected in series between the negative output 104 and the positive output 102 of the floating output power supply 202. The first diode D1 has an anode connected to the negative output 104 of the floating output power supply 202 and a cathode connected to the circuit ground 210. The second diode D2 has a cathode connected to the positive output 102 of the floating output power supply 202. The current sensing resistor R4 is connected between an anode of the second diode D2 and the circuit ground 210. The current sensing input of the controller 206 (i.e., I_sense) is connected to the anode of the second diode D2.

The resistive network 208 is connected in series between the negative output 104 and the positive output 102 of the floating output power supply 202. The resistive network includes first resistor R1, second resistor R2, and third resistor R3. The first resistor R1 is connected between the negative output 104 of the floating output power supply 202 and the circuit ground 210 of the floating output power supply 202. The second resistor R2 has a first terminal connected to the circuit ground 210 of the floating output power supply 202 and a second terminal connected to the voltage sensing input (i.e., V_sense) of the controller 206. The third resistor has a first terminal connected to the positive output 102 of the floating output power supply 202 and a second terminal connected to the second terminal of the second resistor R2. In one embodiment, the resistance of the first resistor R1 is approximately equal to a sum of the resistance of the second resistor R2 and the resistance of the third resistor R3. In one embodiment, the resistance of the second resistor R2 is selected to be less than a product of the resistance of the third resistor R3 and a supply voltage (i.e., V_MCU) of the controller 206 divided by a difference between half of a maximum output voltage of floating output power supply 202 and the supply voltage (i.e., $V_{MCU}$) of the controller 206 (see Equation 7). The supply voltage (i.e., $V_{MCU}$) of the controller 206 may be a bias voltage (e.g., 5 VDC to 12 VDC).

$$R2 < \frac{R3 \times V_{MCU}}{\left(\frac{V_{R\_load\_max}}{2} - V_{MCU}\right)} \quad \text{EQUATION 7}$$

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful CIRCUIT AND METHOD FOR INDIRECTLY SENSING CURRENT AND VOLTAGE IN A FLOATING OUTPUT POWER SUPPLY it is not intended that such references be construed as limitations upon the scope of this invention except as set forth in the following claims.

What is claimed is:

1. A light fixture comprising:

a light source operable to provide light in response to receiving power;

a floating output power supply operable to provide power to the light source, said floating output power supply having a circuit ground, a negative output referenced to a ground electrically separated from the circuit ground, and a positive output;

the floating output power supply further comprising an alternating current (AC) power supply referenced to the circuit ground of the floating output power supply, a controller having a voltage sensing input configured to sense an output voltage of the floating output power supply and a current sensing input configured to sense an output current of the floating output power supply, wherein the controller is configured to adjust an operating characteristic of the AC power supply as a function of the sensed output current and the sensed output voltage, a rectifier circuit comprising a first diode and a second diode connected in series between the negative output and the positive output of the floating output power supply, wherein the first diode has an anode connected to the negative output of the floating output power supply and a cathode connected to the circuit ground and the second diode has a cathode connected to the positive output of the floating output power supply, a current sensing resistor connected between an anode of the second diode and the circuit ground, wherein the current sensing input of the controller is connected to the anode of the second diode, and a resistive network connected in series between the negative output and the positive output of the floating output power supply, said resistive network comprising a first resistor connected between the negative output of the floating output power supply and the circuit ground of the floating output power supply, a second resistor having a first terminal connected to the circuit ground of the floating output power supply and a second terminal connected to the voltage sensing input of the controller, and a third resistor having a first terminal connected to the positive output of the floating output power supply and a second terminal connected to the second terminal of the second resistor; and a housing configured to support the light source and the floating output power supply.

2. The light fixture of claim 1, wherein the AC power supply comprises a variable frequency power supply and the operating parameter of the AC power supply is an operating frequency.

3. The light fixture of claim 1, wherein the controller is configured to sense the output current of the floating output power supply by determining a voltage across the current sensing resistor and dividing the determined voltage by a resistance of the current sensing resistor.

4. The light fixture of claim 1, wherein the controller is further configured to determine a total output current as a function of the sensed output current and adjust the operating characteristic as a function of the determined total output current, wherein the controller determines the total output current by doubling the sensed output current.

5. The light fixture of claim 1, wherein a resistance of the first resistor is approximately equal to a sum of a resistance of the second resistor and a resistance of the third resistor.

6. The light fixture of claim 1, wherein a resistance of the second resistor is selected to be less than a product of a resistance of the third resistor and a supply voltage of the controller divided by a difference between half of a maximum output voltage of the floating output supply and the supply voltage of the controller.

7. The light fixture of claim 1, wherein the controller is configured to adjust the operating characteristic of the AC power supply as a function of the sensed output current and the sensed output voltage by determining an output power as a function of the sensed output current and sensed output voltage and adjusting the operating characteristic of the AC power supply as a function of the determined output power.

8. A floating output power supply having a circuit ground, a negative output referenced to a ground electrically separated from the circuit ground, and a positive output, said floating output power supply comprising:

- an alternating current (AC) power supply referenced to the circuit ground of the floating output power supply;
- a controller having a current sensing input configured to sense an output current of the floating output power supply, wherein the controller is functional to adjust an operating characteristic of the AC power supply as a function of the sensed output current; and
- a rectifier comprising a first diode and a second diode connected in series between the negative output and the positive output of the floating output power supply, wherein
  - the first diode has an anode connected to the negative output of the floating output power supply and a cathode connected to the circuit ground, and
  - the second diode has a cathode connected to the positive output of the floating output power supply; and
  - a current sensing resistor connected between an anode of the second diode and the circuit ground, wherein the current sensing input of the controller is connected to the anode of the second diode.

9. The floating output power supply of claim 8, wherein:

- the controller further comprises a voltage sensing input configured to sense an output voltage of the floating output power supply, wherein the controller is configured to adjust the operating characteristic of the AC power supply as a function of the sensed output voltage; and
- the floating output power supply further comprises a resistive network connected in series between the negative output and the positive output of the floating output power supply, said resistive network comprising
  - a first resistor connected between the negative output of the floating output power supply and the circuit ground of the floating output power supply,
  - a second resistor having a first terminal connected to the circuit ground of the floating output power supply and a second terminal connected to the voltage sensing input of the controller, and
  - a third resistor having a first terminal connected to the positive output of the floating output power supply and a second terminal connected to the second terminal of the second resistor.

10. The floating output power supply of claim 8, wherein the AC power supply comprises a variable frequency power supply and the operating parameter of the AC power supply is an operating frequency.

11. The floating output power supply of claim 8, wherein the controller is configured to sense the output current of the floating output power supply by determining a voltage across the current sensing resistor and dividing the determined voltage by a resistance of the current sensing resistor.

12. The floating output power supply of claim 8, wherein the controller is further configured to determine a total output current as a function of the sensed output current and adjust the operating characteristic as a function of the determined total output current, wherein the controller determines the total output current by doubling the sensed output current.

13. The floating output power supply of claim 8, wherein:

- the controller further comprises a voltage sensing input configured to sense an output voltage of the floating output power supply, wherein the controller is configured to adjust the operating characteristic of the AC power supply as a function of the sensed output voltage and the sensed output current; and
- the floating output power supply further comprises a resistive network connected in series between the negative output and the positive output of the floating output power supply, said resistive network comprising:
  - a first resistor connected between the negative output of the floating output power supply and the circuit ground of the floating output power supply;
  - a second resistor having a first terminal connected to the circuit ground of the floating output power supply and a second terminal connected to the voltage sensing input of the controller; and
  - a third resistor having a first terminal connected to the positive output of the floating output power supply and a second terminal connected to the second terminal of the second resistor, wherein the controller is configured to adjust the operating characteristic of the AC power supply as a function of the sensed output current and the sensed output voltage by determining an output power as a function of the sensed output current and sensed output voltage and adjusting the operating characteristic of the AC power supply as a function of the determined output power.

14. A floating output power supply having a circuit ground, a negative output referenced to a ground electrically separated from the circuit ground, and a positive output, said floating output power supply comprising:

- an alternating current (AC) power supply referenced to the circuit ground of the floating output power supply;
- a controller having a voltage sensing input configured to sense an output voltage of the floating output power supply, wherein the controller is configured to adjust an operating characteristic of the AC power supply as a function of the sensed output voltage; and
- a resistive network connected in series between the negative output and the positive output of the floating output power supply, said resistive network comprising
  - a first resistor connected between the negative output of the floating output power supply and the circuit ground of the floating output power supply,
  - a second resistor having a first terminal connected to the circuit ground of the floating output power supply and a second terminal connected to the voltage sensing input of the controller, and a third resistor having a first terminal connected to the positive output of the floating output power supply and a second terminal connected to the second terminal of the second resistor.

15. The floating output power supply of claim 14, wherein the controller further comprises a current sensing input configured to sense an output current of the floating output power supply, and the controller is configured to adjust the operating characteristic of the AC power supply as a function of the sensed output current; and the floating output power supply further comprises a rectifier comprising a first diode and a second diode connected in series between the negative output and the positive output of the floating output power supply, wherein the first diode has an anode connected to the negative output of the floating output power supply and a cathode connected to the circuit ground, and the second diode has a cathode connected to the positive output of the floating output power supply; and a current sensing resistor coupled between an anode of the second diode and the circuit ground, wherein the current sensing input of the controller is coupled to the anode of the second diode.

16. The floating output power supply of claim 14, wherein the AC power supply comprises a variable frequency power supply and the operating parameter of the AC power supply is an operating frequency.

17. The floating output power supply of claim 14, wherein a resistance of the first resistor is approximately equal to a sum of a resistance of the second resistor and a resistance of the third resistor.

18. The floating output power supply of claim 14, wherein a resistance of the second resistor is selected to be less than a product of a resistance of the third resistor and a supply voltage of the controller divided by a difference between half of a maximum output voltage of the floating output supply and the supply voltage of the controller.

19. The floating output power supply of claim 8, wherein the controller further comprises a current sensing input configured to sense an output current of the floating output power supply, and the controller is configured to adjust the operating characteristic of the AC power supply as a function of the sensed output current; and the floating output power supply further comprises a rectifier circuit having a first diode and a second diode coupled in series between the negative output and the positive output of the floating output power supply, wherein the first diode has an anode coupled to the negative output of the floating output power supply and a cathode coupled to the circuit ground, and the second diode has a cathode coupled to the positive output of the floating output power supply; and a current sensing resistor coupled between an anode of the second diode and the circuit ground, wherein the current sensing input of the controller is coupled to the anode of the second diode and wherein the controller is configured to adjust the operating characteristic of the AC power supply as a function of the sensed output current and the sensed output voltage by determining an output power as a function of the sensed output current and sensed output voltage and adjusting the operating characteristic of the AC power supply as a function of the determined output power.

* * * * *